United States Patent
Yu

(10) Patent No.: US 9,910,989 B2
(45) Date of Patent: Mar. 6, 2018

(54) MALWARE REMOVAL METHOD AND SYSTEM, AND COMPUTER STORAGE MEDIUM

(71) Applicant: TENCENT TECHNOLOGY (SHENZHEN) COMPANY LIMITED, Shenzhen, Guangdong (CN)

(72) Inventor: Xiao Yu, Shenzhen (CN)

(73) Assignee: TENCENT TECHNOLOGY (SHENZHEN) CO., LTD., Shenzhen (CN)

( * ) Notice: Subject to any disclaimer, the term of this patent is extended or adjusted under 35 U.S.C. 154(b) by 335 days.

(21) Appl. No.: 14/560,717

(22) Filed: Dec. 4, 2014

(65) Prior Publication Data
US 2015/0089654 A1    Mar. 26, 2015

Related U.S. Application Data

(63) Continuation of application No. PCT/CN2013/076767, filed on Jun. 5, 2013.

(30) Foreign Application Priority Data

Jun. 7, 2012 (CN) .......................... 2012 1 0186501

(51) Int. Cl.
*G06F 21/00* (2013.01)
*G06F 21/56* (2013.01)

(52) U.S. Cl.
CPC ...... *G06F 21/568* (2013.01); *G06F 2221/034* (2013.01)

(58) Field of Classification Search
CPC ...... G06F 21/56; G06F 21/566; G06F 21/568; G06F 21/554; G06F 21/575;
(Continued)

(56) References Cited

U.S. PATENT DOCUMENTS

| | | | |
|---|---|---|---|
| 8,239,947 B1* | 8/2012 | Glick | G06F 21/52 713/1 |
| 8,495,741 B1* | 7/2013 | Naftel | G06F 21/575 713/165 |
| 2011/0209220 A1* | 8/2011 | Tikkanen | G06F 21/56 726/24 |

FOREIGN PATENT DOCUMENTS

| | | |
|---|---|---|
| CN | 101950336 A | 1/2011 |
| CN | 102024114 A | 4/2011 |

(Continued)

OTHER PUBLICATIONS

Chinese Office Action dated Sep. 18, 2013 in corresponding Chinese Patent Application No. 201210186501.4 (9 pages).

(Continued)

*Primary Examiner* — Yogesh Paliwal
(74) *Attorney, Agent, or Firm* — Staas & Halsey LLP

(57) ABSTRACT

A method, device, and a computer storage medium are provided. The method includes: starting a core file and building an environment after running an operation system, then loading a driver in the built environment; reading a configuration file by the driver to obtain a path of a malware; and deleting a registry and file of the malware in a kernel layer according to the path. The device includes: a start loading module configured to start a core file and build an environment after running an operation system, then load a driver in the built environment; a path reading module configured to calculate a configuration file by the driver to obtain a path of a malware; and a program deleting module configured to delete a registry and file of the malware in a kernel layer according to the path.

11 Claims, 5 Drawing Sheets

(58) Field of Classification Search
CPC . G06F 2221/034; H04L 63/14; H04L 63/145;
H04L 63/1441
USPC .......................................................... 726/23
See application file for complete search history.

(56) References Cited

FOREIGN PATENT DOCUMENTS

| | | |
|---|---|---|
| CN | 102339371 A | 2/2012 |
| CN | 102722680 A | 10/2012 |
| WO | WO 2006/065882 A2 | 6/2006 |

OTHER PUBLICATIONS

International Search Report (Form PCT/ISA/210) dated Sep. 12, 2013 in corresponding PCT Application No. PCT/CN2013/076767 (2 pages) (2 pages English Translation).

* cited by examiner

MALWARE REMOVAL METHOD AND SYSTEM, AND COMPUTER STORAGE MEDIUM

CROSS-REFERENCE TO RELATED APPLICATION

This application is a continuation application of International Application No. PCT/CN2013/076767, filed Jun. 5, 2013 and claims foreign priority to Chinese Patent Application No. 201210186501.4, filed in China Patent Office on Jun. 7, 2012, the entire disclosures of which are incorporated herein by reference in their entireties as a part of this application.

FIELD OF THE INVENTION

The present disclosure relates to computer security technologies, and more particularly relates to a malware removal method and system, and computer storage medium.

BACKGROUND OF THE INVENTION

With the rapid development of various computer applications, malwares run on the computer spread and are stubbornly resided on the computer, such that the security is serious harmed. In order to reside in the operating system of a computer, the malwares have developed a variety of techniques to protect themselves, therefore they cannot be removed by conventional security software.

The conventional security software usually remove the malware by the following manners: (1) force deleting the registry or file of the malware in a driver layer; however, after deletion, the malware can perform write-back, thus the registry or file of the malware cannot be force deleted; (2) using an accounting pit file to prevent the write-back of the malware, which has the highest system privilege in the kernel and a sharing open is prohibited, however, when being aware of the write-back failure, the malware will be renamed and re-create write-back file until the write-back is successful; (3) writing the file path of the malware in the registry, and deleting the malware according to the file path in the registry during the start up of the system, however, the malware can monitor the registry key during the start up, and it can delete the registry key as long as it finds the protected path exists in the registry key, such that the deletion of the malware is failure; (4) deleting the write-back process of the malware, and then deleting the corresponding registry and file of the malware, however, if the malware enters the system process and write-back the file or registry in the system process, the deletion of the write-back process will fail, so that the registry and the file of the malware cannot be deleted.

As for the conventional security software, the malware uses protective technology or has logic to bypass deleting of the security software, which results in that the security software cannot do anything to the malware resident in the operating system even if it has been found, which greatly reducing the security.

SUMMARY OF THE INVENTION

Accordingly, it is necessary to address the problem of poor security and provide a malware removal method which can increase the security.

In addition, it is necessary to provide a malware removal device which can increase the security.

Furthermore, it is necessary to provide a computer storage medium which can increase the security.

A method of removing malware includes the following steps:

starting a core file and building an environment after running an operation system, then loading a driver in the built environment;

reading a configuration file by the driver to obtain a path of a malware; and deleting a registry and file of the malware in a kernel layer according to the path of the malware.

A method of removing malware includes the following steps:

reading by a driver to obtain a registry path of a malware, when an operation system being shutting down and releasing a registry; and calling a registry uninstall function to delete a registry of the malware according to the registry path of the malware.

In one embodiment, the method further includes:

reading by the driver to obtain a file path of the malware, when the operation system being shutting down and releasing a file system; and calling a file uninstall function to delete a file of the malware according to the file path of the malware.

A malware removal device includes:

a start loading module configured to start a core file and build an environment after running an operation system, then load a driver in the built environment;

a path reading module configured to calculate a configuration file by the driver to obtain a path of a malware; and a program deleting module configured to delete a registry and file of the malware in a kernel layer according to the path of the malware.

A malware removal device includes:

a registry releasing module configured to read by a driver to obtain a registry path of a malware, when an operation system being shutting down and releasing a registry; and a registry uninstalling module configured to call a registry uninstall function to delete a registry of the malware according to the registry path of the malware.

A computer storage medium for storing computer-executable instructions is used for controlling a method of removing malware, wherein the method includes:

starting a core file and building an environment after running an operation system, then loading a driver in the built environment;

reading a configuration file by the driver to obtain a path of a malware; and deleting a registry and file of the malware in a kernel layer according to the path of the malware.

A computer storage medium for storing computer-executable instructions is used for controlling a method of removing malware, wherein the method includes:

reading by a driver to obtain a registry path of a malware, when an operation system being shutting down and releasing a registry; and calling a registry uninstall function to delete a registry of the malware according to the registry path of the malware.

In the forgoing malware removal method, device, and computer storage medium, the driver is loaded when the core file is run during the start up of the operating system, and the registry and file of the malware are deleted in the kernel layer according to the path of the malware, such that the malware will be removed before it has not yet been run. In addition, the driver run in the kernel layer has a higher system privilege than that run in the application layer, such that it can force delete the malware and increase the security.

DETAILED DESCRIPTION OF THE EMBODIMENTS

Figure 1:
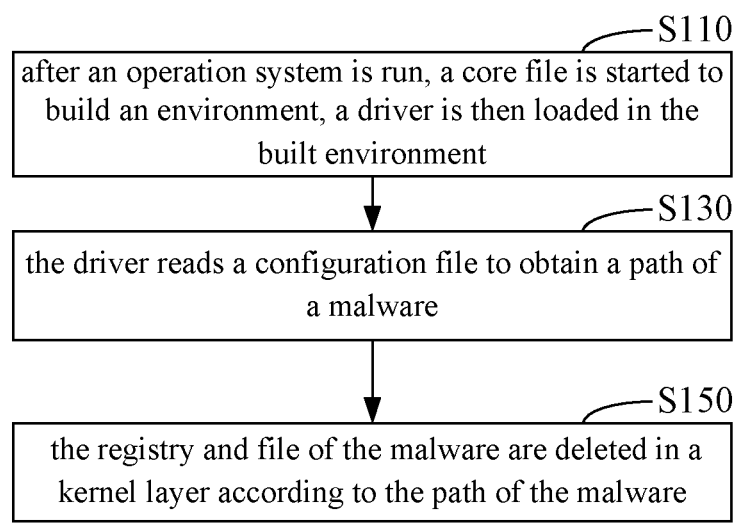
FIG. 1 is a flow chart of a method of removing malware according to an embodiment.

Referring to FIG. 1, in one embodiment, a method of removing malware includes the following steps:

Step S110, after an operation system (operating system) is run, a core file is started to build an environment, a driver is then loaded in the built environment.

In the illustrated embodiment, after the operation system is started, following procedures will be executed: reading master boot record (MBR), reading DOS boot record (DBR), initializing registry and NT Loader (NTLDR), running core file (NTOSKRNL.EXE), initializing the system variables (SMSS.EXE) and loading the user login process (WINLOGON.EXE). The core file is substantially the program NTOSKRNL.EXE. The initialization of the registry and the file system is completed along with the startup of the operating system. After the registry and the file system are initialized by the program NTOSKRNL.EXE, a kernel calling stage is entered to provide a kernel driving environment for the drivers, such that the loaded drivers can be run in the kernel layer.

Step S130, the driver reads a configuration file to obtain a path of a malware.

In the illustrated embodiment, the driver is configured to execute the operation of removing the malware. The driver is triggered by calling during the running of the core file to execute the operation of removing the malware. The configuration file has recorded the verified malware to be deleted and a corresponding path of the malware.

In one embodiment, the step S130 includes: traversing the configuration file via the driver, and reading to obtain a registry path and a file path of the malware, respectively.

In the illustrated embodiment, the malware includes a registry and a file, which are usually recorded in different locations. Accordingly, the path read from the configuration file includes the registry path and the file path of the malware.

Step S150, the registry and file of the malware are deleted in a kernel layer according to the path of the malware.

In the illustrated embodiment, the driver run in the kernel layer has the highest privileges within the operating system priority, it can access any memory and hardware directly without any restrictions, as a result, it can delete the registry and file of the malware via a force deleting file interface of the kernel layer. The force deleting file interface is a bottom level interface built on the driver having the highest privileges within the operating system priority, and it can bypass the system security check mechanism. Compared with the deleting interface within the application level, the force deleting file interface will not result in a deleting failure due to the system security check mechanism, such that the force deleting of the registry and the file of the malware is achieved.

In the described malware removal method, the execution of removing the malware is triggered by the driver running in the kernel layer when the core file is run during the start up of the operating system, at that time, the malware has not been run yet because the operating system has just completed the registry and file initialization. Accordingly, the currently executed malware removal procedure is able to prevent the write-back of the malware to the registry and file of the malware is removed completely, thus avoiding a removing failure of the malware.

Figure 2:
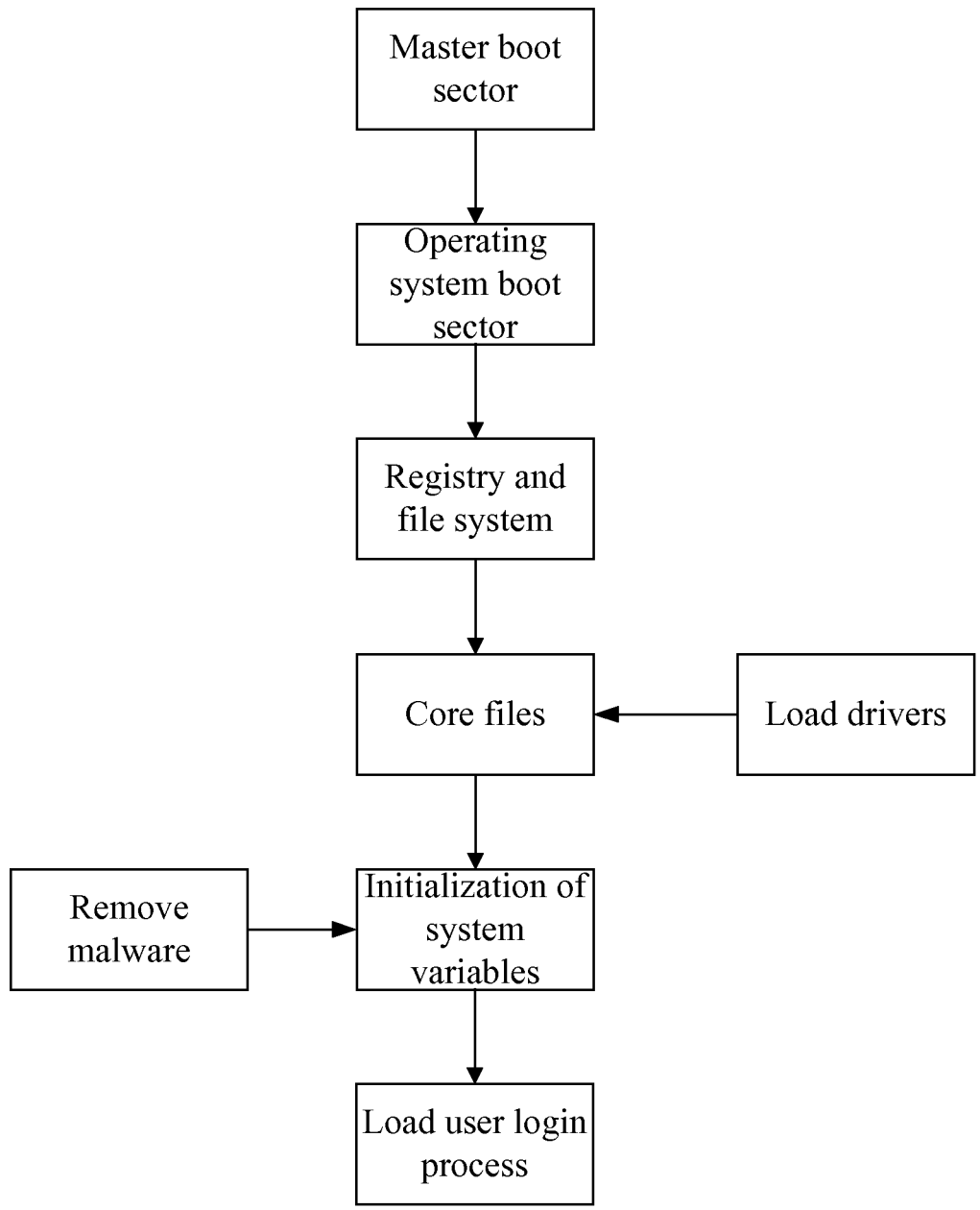
FIG. 2 is a schematic drawing showing the method of removing malware according to an embodiment.

Additionally, in the conventional malware removing method, the malware is deleted after running the program SMSS.EXE after the completion of kernel calling stage running the core file, when the operating system has completed the registry and file initializations (i.e., when SMSS.EXE is completed). However, since the malware has already been run at that time after completion of the SMSS.EXE, the write-back of the malware cannot be avoided, which consequently leads to a removing failure. In the present malware removal method, the malware is removed immediately after the completion of the kernel calling stage running the core file and before completion of registry and file initialization (i.e., before completion of or during the SMSS.EXE), as long as the core file is run. As shown in FIG. 2, after the operation system is started, following procedures will be executed: reading master boot record (MBR), reading DOS boot record (DBR), initializing registry and NT Loader (NTLDR), running core file (NTOSKRNL.EXE), initializing the system variables (SMSS.EXE) and loading the user login process (WINLOGON.EXE). The driver is loaded after running NTOSKRNL.EXE, and the malware is deleted as soon as the core file is run immediately after the completion of the kernel calling stage running the core file and before completion of registry and file initialization (i.e., before completion of or during the SMSS.EXE), when running the program SMSS.EXE. Since the removing procedure is performed during the start up of the operating system as soon as the core file is run, the write-back of the malware is skillfully avoided.

Figure 3:
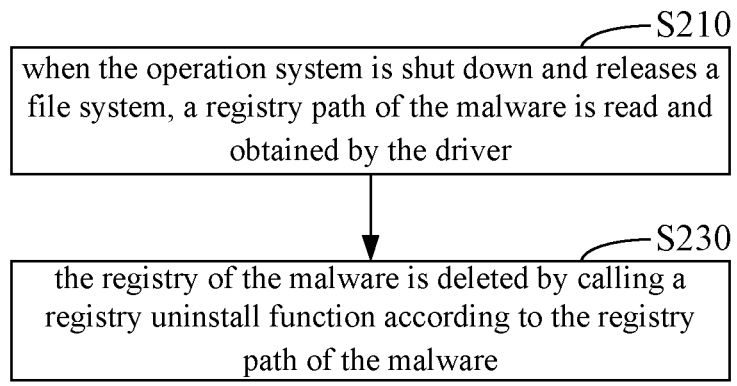
FIG. 3 is a flow chart of a method of removing malware according to another embodiment.

Referring to FIG. 3, in another embodiment, the method of removing malware further includes the following steps:

Step S210, when the operation system is shut down and releases a file system, a registry path of the malware is read and obtained by the driver.

In the illustrated embodiment, when the operating system is started, the loading of registry and file system is executed. Correspondingly, when the operating system is shut down, the unloading of the registry and the file system is triggered, so as to release the registry and the file system in the memory. When releasing the registry, the registry path of the malware is read immediately, and the deleting operation of the registry of the malware is then executed. Accordingly, the registry of the malware can be removed during the shutdown of operating system and releasing of the registry, such that the malware cannot write-back the registry, and the registry of the malware is removed completely.

Step S230, the registry of the malware is deleted by calling a registry uninstall function according to the registry path of the malware.

In the illustrated embodiment, when reading the registry path of the malware, the deletion of the registry of the malware is executed by the driver calling a registry uninstall function. The registry uninstall function is a registry uninstall callback routine.

In another embodiment, prior to step S230, the method further includes: pre-registering the registry uninstall function.

In the embodiment, the registry uninstall function is pre-registered, such that during the forgoing registry removing process, the registry uninstall function can be automatically called along with the shutdown procedure of the operating system, and the registry uninstall function can be smoothly called when the registry is released.

Figure 4:
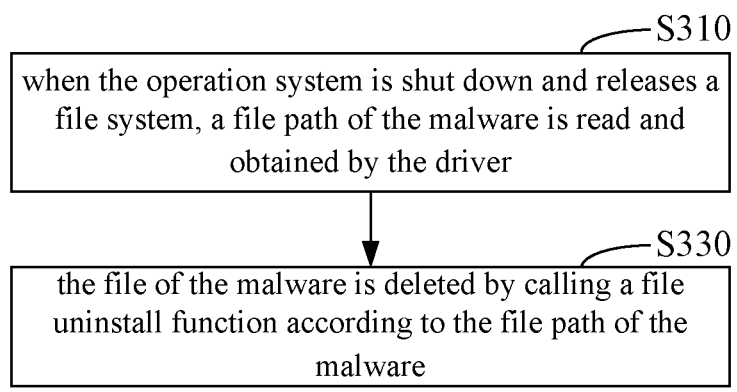
FIG. 4 is a flow chart of a method of removing malware according to yet another embodiment.

Referring to FIG. 4, in another embodiment, the method of removing malware further includes the following steps.

S310, when the operation system is shut down and releases a file system, a file path of the malware is read and obtained by the driver.

In the illustrated embodiment, after releasing the registry, the file system will be unloaded, such that the file system will be released from the memory. When the file system is released, the file path of the malware will be read by the driver, deleting operation of the file of the malware is then executed immediately during releasing the file system, thus the write-back of the malware is prevented and the file of the malware is removed completely.

Step S330, the file of the malware is deleted by calling a file uninstall function according to the file path of the malware.

In the illustrated embodiment, when reading the file path of the malware, the deletion of the file of the malware is executed by the driver calling a file uninstall function. The file uninstall function is a file uninstall callback routine.

In another embodiment, prior to step S330, the method further includes: pre-registering the file uninstall function.

In the embodiment, the file uninstall function is pre-registered, such that during the forgoing registry removing process, the file uninstall function can be automatically called along with the shutdown procedure of the operating system, and the file uninstall function can be smoothly called when the file system is released.

Figure 5:
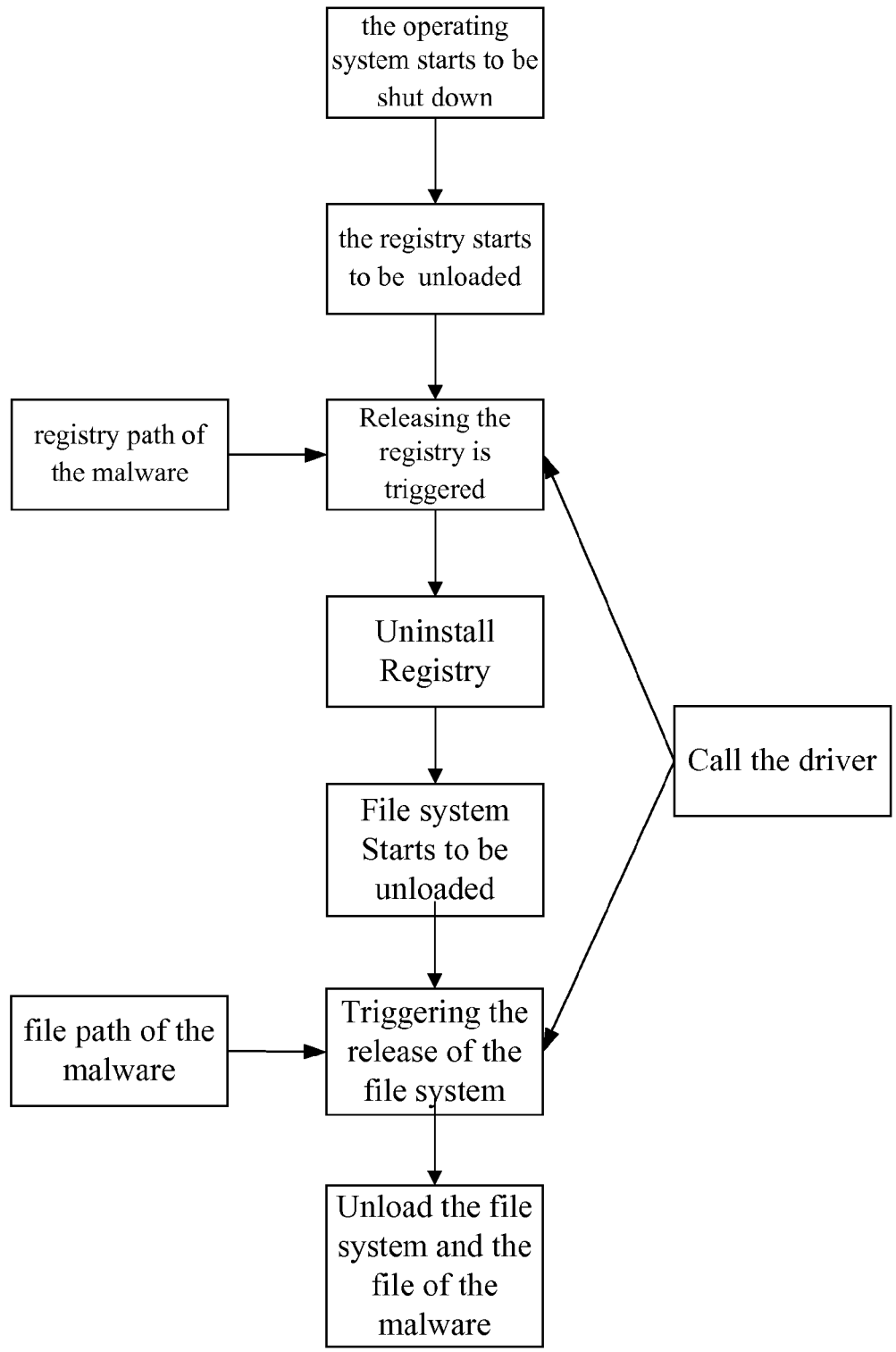
FIG. 5 is a schematic drawing showing the method of removing malware according to another embodiment.

Referring to FIG. 5, in an embodiment, when the operating system starts to be shut down, the registry is firstly unloaded. When releasing the registry, the registry path of the malware is read immediately, and the deleting operation of the registry of the malware is then executed. When the releasing of the registry is completed, the file system is unloaded. When the file system is released, the file path of the malware will be read by the driver, and the file system and the file of the malware are then deleted.

In the forgoing malware removal method, during the shutdown process of the operating system, the malware is removed by the driver along with the releasing of the registry and the file system. Since the registry and the file system have already been released by the operating system, the malware cannot write-back the registry and the file, such that the malware can be successfully removed, thus greatly increasing the security of the system.

In an embodiment, the malware successfully removed during the shutdown process of the operating system is usually by a program driven by the kernel.

The device which can remove the malware during the shutdown process of the operating system can be executed independently, in other words, the removal of the malware can be executed during the shutdown of the operating system rather than during the running of the operating system, therefore, a method for removing the malware during the shutdown of the operating system is provided.

In the forgoing malware removal method, the malware can be removed by the driver running the core file during the start up of the operating system. If the removing is not successful at this time, the malware will be removed again during the shutdown of the operating system along with the releasing of the registry and file system, such that the malware can be removed. In other words, it is an extra safe to remove the malware during both the start up and shutdown of the operating system, thus greatly increasing the security.

Furthermore, in the actual application process, the two method of removing the malware during the start up and the shutdown of the operating system can be flexibly chosen dependent on the security.

Figure 6:
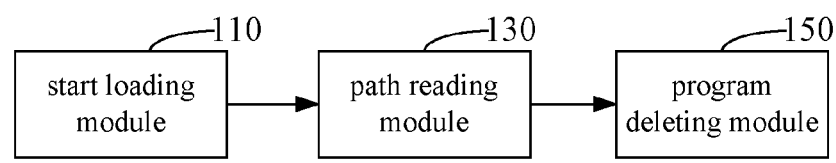
FIG. 6 is a block diagram showing a malware removal device according to an embodiment.

Referring to FIG. 6, in one embodiment, a malware removal device includes a start loading module 110, a path reading module 130, and a program deleting module 150.

The start loading module 110 is configured to start a core file and build an environment after running an operation system, then load a driver in the built environment.

In the illustrated embodiment, after the operation system is started, following procedures will be executed: reading master boot record (MBR), reading DOS boot record (DBR), initializing registry and NT Loader (NTLDR), running core file (NTOSKRNL.EXE), initializing the system variables (SMSS.EXE) and loading the user login process (WINLOGON.EXE). The core file is substantially the program NTOSKRNL.EXE. The initialization of the registry and the file system is completed along with the startup of the operating system. After the registry and the file system are initialized by the program NTOSKRNL.EXE, a kernel calling stage is entered to provide a kernel driving environment for the drivers, such that the loaded drivers can be run in the kernel layer.

The path reading module 130 is configured to calculate a configuration file by the driver to obtain a path of a malware.

In the illustrated embodiment, the driver is configured to execute the operation of removing the malware. The driver is triggered by calling during the running of the core file to execute the operation of removing the malware. The configuration file has recorded the verified malware to be deleted and a corresponding path of the malware.

In alternative embodiment, the path reading module 130 is further configured to traverse the configuration file via the driver, and read to obtain a registry path and a file path of the malware, respectively.

In the illustrated embodiment, the malware includes a registry and a file, which are usually recorded in different locations. Accordingly, the path read by the path reading module 130 from the configuration file includes the registry path and the file path of the malware.

The program deleting module 150 is configured to delete a registry and file of the malware in a kernel layer according to the path of the malware.

In the illustrated embodiment, the driver run in the kernel layer has the highest privileges within the operating system priority, it can access any memory and hardware directly without any restrictions, as a result, it can delete the registry and file of the malware via a force deleting file interface of the kernel layer. The force deleting file interface is a bottom level interface built on the driver having the highest privileges within the operating system priority, and it can bypass the system security check mechanism. Compared with the deleting interface within the application level, the force deleting file interface will not result in a deleting failure due to the system security check mechanism, such that the force deleting of the registry and the file of the malware is achieved.

In the described malware removal device, the execution of removing the malware is triggered by the driver running in the kernel layer when the core file is run during the start up of the operating system, at that time, the malware has not been run yet because the operating system has just completed the registry and file initialization. Accordingly, the currently executed malware removal procedure is able to prevent the write-back of the malware to the registry and file of the malware is removed completely, thus avoiding a removing failure of the malware.

Additionally, in the conventional malware removing method, the malware is deleted after running the program SMSS.EXE after the completion of kernel calling stage running the core file, when the operating system has completed the registry and file initializations (i.e., when SMSS.EXE is completed). However, since the malware has already been run at that time after completion of the SMSS.EXE, the write-back the malware cannot be avoided, which consequently leads to a removing failure. In the present malware removal device, the malware is removed immediately as long as the core file is run, thus the write-back of the malware is skillfully avoided.

Figure 7:
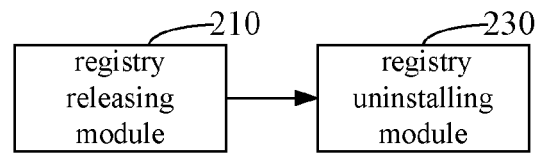
FIG. 7 is a block diagram showing a malware removal device according to another embodiment.

Referring to FIG. 7, in one embodiment, the malware removal device further includes a registry releasing module 210 and a registry uninstalling module 230.

The registry releasing module 210 is configured to read by the driver to obtain a registry path of the malware, when the operation system being shutting down and releasing the registry.

In the illustrated embodiment, when the operating system is started, the loading of registry and file system is executed. Correspondingly, when the operating system is shut down, the unloading of the registry and the file system is triggered, so as to release the registry and the file system in the memory. When releasing the registry, the registry path of the malware is read by the registry releasing module 210 immediately, and the deleting operation of the registry of the malware is then executed. Accordingly, the registry of the malware can be removed during the shutdown of operating system and releasing of the registry, such that the malware cannot write-back the registry, and the registry of the malware is removed completely.

The registry uninstalling module 230 is configured to call a registry uninstall function to delete the registry of the malware according to the registry path of the malware.

In the illustrated embodiment, when reading the registry path of the malware, the deletion of the registry of the malware is executed by the registry uninstalling module 230 calling a registry uninstall function via the driver. The registry uninstall function is a registry uninstall callback routine.

Figure 8:
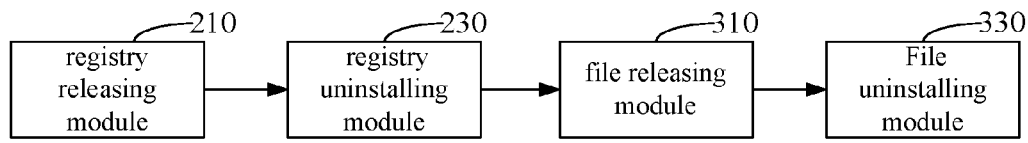
FIG. 8 is a block diagram showing a malware removal device according to yet another embodiment.

Referring to FIG. 8, in another embodiment, the malware removal device further includes a file releasing module 310 and a file uninstalling module 330.

The file releasing module 310 is configured to read by the driver to obtain a file path of the malware, when the operation system being shutting down and releasing a file system.

In the illustrated embodiment, after releasing the registry, the file system will be unloaded, such that the file system will be released from the memory. When the file system is released, the file path of the malware will be read by the file releasing module 310 via the driver, deleting operation of the file of the malware is then executed immediately during releasing the file system, thus the write-back of the malware is prevented and the file of the malware is removed completely.

The file uninstalling module 330 is configured to call a file uninstall function to delete the file of the malware according to the file path of the malware.

In alternative embodiment, the malware removal device further includes a registering module configured to pre-register the registry uninstall function and pre-register the file uninstall function.

In the illustrated embodiment, the registering module can pre-register the registry uninstall function and the file uninstall function, such that during the forgoing registry removing process, the registry uninstall function and the file uninstall function can be automatically called along with the shutdown procedure of the operating system, and the registry uninstall function and the file uninstall function can be smoothly called when the registry and file system are released.

In the forgoing malware removal device, during the shutdown process of the operating system, the malware is removed by the driver along with the releasing of the registry and the file system. Since the registry and the file system have already been released by the operating system, the malware cannot write-back the registry and the file of the malware is removed completely, such that the malware can be successfully removed, thus greatly increasing the security of the system.

In an embodiment, the malware successfully removed during the shutdown process of the operating system is usually by a program driven by the kernel.

The device which can remove the malware during the shutdown process of the operating system can be executed independently, in other words, the removal of the malware can be executed during the shutdown of the operating system rather than during the running of the operating system, therefore, a device for removing the malware during the shutdown of the operating system is provided.

In the forgoing malware removal device, the malware can be removed by the driver running the core file during the start up of the operating system. If the removing is not successful at this time, the malware will be removed again during the shutdown of the operating system along with the releasing of the registry and file system, such that the malware can be removed. In other words, it is an extra safe to remove the malware during both the start up and shutdown of the operating system, thus greatly increasing the security.

Furthermore, in the actual application process, the two method of removing the malware during the start up and the shutdown of the operating system can be flexibly chosen dependent on the security.

In the forgoing malware removal method, device, and computer storage medium, the driver is loaded when the core file is run during the start up of the operating system, and the registry and file of the malware are deleted in the kernel layer according to the path of the malware, such that the malware will be removed before it has not yet been run. In addition, the driver run in the kernel layer has a higher system privilege than that run in the application layer, such that it can force delete the malware and increase the security.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. The method of removing malware in a computer that executes an operating system, the method comprising:

during start up of the operating system, starting a core file and building a kernel driver environment in a kernel layer for same operating system, and loading a driver in the built kernel driver environment before completion of registry and file systems initialization;

reading, by the driver in the kernel layer, a configuration file to obtain a registry and file path of a malware; and deleting, by the driver in the kernel layer before the completion of registry and file systems initialization, a registry and file of the malware according to the obtained registry and file path of the malware, in response to the deleting being unsuccessful, reading by the driver in the kernel layer to obtain the registry path of the malware, when the operating system shutting down and releasing the registry system for the operating system; and calling a registry uninstall function to delete the registry of the malware according to the registry path of the malware.

2. The method according to claim 1, wherein the deleting, by the driver in the kernel layer before the completion of registry and file systems initialization, the registry and file of the malware, comprises:

deleting the registry and file of the malware via the driver run in the kernel layer utilizing a force deleting file interface of the kernel layer.

3. The method according to claim 1, wherein the reading, by the driver in the kernel layer, the configuration file comprises:

traversing the configuration file to obtain the registry path and the file path of the malware, respectively.

4. The method according to claim 1, further comprising:

reading by the driver in the kernel layer to obtain the file path of the malware, when the operating system shutting down and releasing the file system for the operating system; and calling a file uninstall function to delete the file of the malware according to the file path of the malware.

5. The method according to claim 4, wherein prior to the calling the registry uninstall function to delete the registry of the malware according to the registry path of the malware, the method further comprises:

pre-registering the registry uninstall function;

prior to the calling a file uninstall function to delete the file of the malware according to the file path of the malware, the method further comprises:

pre-registering the file uninstall function.

6. A malware removal device comprising:

non-transitory computer readable storage medium to store registry(ies), files and program(s), and computer hardware configured, including configured by the program(s), to implement modules to:

during start up of an operating system program, start a core file and build kernel driver environment in a kernel layer for same operating system, and load a driver in the built kernel driver environment before completion of registry and file systems initialization;

read, by the driver in the kernel layer, a configuration file to obtain a registry and file path of a malware;

perform a deletion, by the driver in the kernel layer before the completion of registry and file systems initialization, of a registry and file of the malware according to the obtained registry and file path of the malware; and in response to the deletion being unsuccessful, read by the driver in the kernel layer to obtain the registry path of the malware, when the operating system shutting down and releasing the registry system for the operating system; and call a registry uninstall function to delete the registry of the malware according to the registry path of the malware.

7. The malware removal device according to claim 6, wherein the deletion, by the driver in the kernel layer before the completion of registry and file systems initialization, deletes the registry and file of the malware via the driver run in the kernel layer by utilizing a force deleting file interface of the kernel layer.

8. The malware removal device according to claim 6, wherein the reading the configuration file traverses the configuration file via the driver, to obtain the registry path and the file path of the malware, respectively.

9. The malware removal device according to claim 6, the computer hardware configuration further implements modules to:

read by the driver in the kernel layer to obtain the file path of the malware, when the operating system shutting down and releasing the file system for the operating system; and call a file uninstall function to delete the file of the malware according to the file path of the malware.

10. The malware removal device according to claim 9, the computer hardware configuration further implements modules to:

pre-register the registry uninstall function and pre-register the file uninstall function.

11. A non-transitory computer storage medium for storing computer-executable instructions used for controlling a method of removing malware in a computer that executes an operating system, wherein the method comprises:

during start up of the operating system, starting a core file and building a kernel driver environment in a kernel layer for same operating system, and loading a driver in the built kernel driver environment before completion of registry and file systems initialization;

reading, by the driver in the kernel layer, a configuration file to obtain a registry and file path of a malware;

deleting, by the driver in the kernel layer before the completion of registry and file systems initialization, a registry and file of the malware according to the obtained registry and file path of the malware; and in response to the deleting being unsuccessful, while the operating system shuts down and releases the registry system for the operating system, calling a registry uninstall function to control a deletion of a registry of the malware according to the registry path of the malware.

* * * * *